United States Patent
Dong

(10) Patent No.: US 12,418,378 B2
(45) Date of Patent: Sep. 16, 2025

(54) INFORMATION TRANSMISSION METHOD AND COMMUNICATION DEVICE, AND STORAGE MEDIUM

(71) Applicant: Beijing Xiaomi Mobile Software Co., Ltd., Middle Xierqi Road (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 329 days.

(21) Appl. No.: 17/923,450

(22) PCT Filed: May 6, 2020

(86) PCT No.: PCT/CN2020/088810
§ 371 (c)(1),
(2) Date: Nov. 4, 2022

(87) PCT Pub. No.: WO2021/223111
PCT Pub. Date: Nov. 11, 2021

(65) Prior Publication Data
US 2023/0198710 A1 Jun. 22, 2023

(51) Int. Cl.
*H04L 5/00* (2006.01)
(52) U.S. Cl.
CPC .................. *H04L 5/0051* (2013.01)
(58) Field of Classification Search
None
See application file for complete search history.

(56) References Cited

U.S. PATENT DOCUMENTS

| | | |
|---|---|---|
| 2015/0296359 A1 | 10/2015 | Edge |
| 2019/0037529 A1* | 1/2019 | Edge ..................... H04W 64/00 |
| 2019/0327706 A1* | 10/2019 | Agnihotri ............. H04W 24/10 |
| 2019/0327707 A1* | 10/2019 | Agnihotri ................ G01S 5/10 |
| 2019/0387491 A1* | 12/2019 | Han ........................... G01S 5/10 |
| 2019/0393970 A1* | 12/2019 | Kumar ................... H04W 24/10 |
| 2020/0178202 A1* | 6/2020 | Edge ....................... H04L 5/005 |
| 2020/0235877 A1* | 7/2020 | Manolakos ........... H04W 72/04 |
| 2020/0267686 A1* | 8/2020 | Hunukumbure .. H04W 72/0446 |
| 2020/0344712 A1* | 10/2020 | Akkarakaran ...... H04W 64/003 |
| 2021/0297216 A1* | 9/2021 | Shreevastav .......... H04L 5/0048 |
| 2021/0333353 A1* | 10/2021 | Busin ..................... G01S 5/0278 |
| 2022/0132463 A1* | 4/2022 | Cha ........................ H04B 17/27 |
| 2023/0412336 A1* | 12/2023 | Cha ........................ H04W 72/51 |
| 2024/0356700 A1* | 10/2024 | Manolakos ........... H04W 4/029 |

FOREIGN PATENT DOCUMENTS

| | | |
|---|---|---|
| CN | 102461292 A | 5/2012 |
| CN | 102573084 A | 7/2012 |
| CN | 103168249 A | 6/2013 |

(Continued)

*Primary Examiner* — Phirin Sam
(74) *Attorney, Agent, or Firm* — Volpe Koenig

(57) ABSTRACT

An information transmission method, the method includes: determining a first positioning reference signal (PRS) configuration for sending a first PBS, where the first PRS configuration is determined based on a second PRS configuration used when a second base station sends a second PRS, and an interference degree between the first PRS sent by the first base station according to the first PRS configuration and the second PRS sent by the second base station according to the second PRS configuration satisfies of a low interference condition.

19 Claims, 6 Drawing Sheets

(56) References Cited

FOREIGN PATENT DOCUMENTS

| CN | 108702275 A | 10/2018 |
| CN | 110192117 A | 8/2019 |
| CN | 110365455 A | 10/2019 |
| CN | 110999432 A | 4/2020 |
| WO | 2019027536 A1 | 2/2019 |

* cited by examiner

INFORMATION TRANSMISSION METHOD AND COMMUNICATION DEVICE, AND STORAGE MEDIUM

CROSS REFERENCE TO RELATED APPLICATION

The present application is a U.S. National Stage of International Application No. PCT/CN2020/088810, filed on. May 6, 2020, the contents of all of which. are incorporated herein by reference in their entireties for all purposes.

BACKGROUND

The R16 version of the $5^{th}$ generation cellular mobile communication technology introduces a variety of positioning technologies, which can position user equipment (UE). In some positioning technologies, a positioning reference signal (PRS) is introduced for position the user equipment.

SUMMARY

According to a first aspect of the disclosure, an information transmission method is provided. The information transmission method is applied to a first base station and includes:

determining a first positioning reference signal (PRS) configuration for sending a first PRS, where the first PRS configuration is determined based on a second PRS configuration used when a second base station sends a second PRS; and an interference degree between the first PRS sent by the first base station according to the first PRS configuration and the second PRS sent by the second base station according to the second PRS configuration satisfies of a low interference condition.

According to a second aspect of the disclosure, an information transmission method is provided. The information transmission method is applied to a core network and includes:

sending a third PRS configuration to a first base station, where the third PRS configuration includes: a first PRS configuration for the first base station to send a first PRS, and/or a second PRS configuration used when a second base station sends a second PRS, the second PRS configuration being used for the first base station to determine the first PRS configuration, and a degree of interference between the first PRS sent by the first base station using the first PRS configuration and the second PRS sent by the second base station using the second PRS configuration satisfies of a low interference condition.

According to a third aspect of the disclosure, a communication is provided. The communication device includes a processor, a transceiver, a memory, and an executable program stored on the memory and executable by the processor, where when running the executable program, the processor executes steps of the information transmission method according to the first or second aspect.

According to a fourth aspect of the disclosure, a non-transitory computer-readable storage medium is provided, storing an executable program, where the executable program implements steps of the information transmission method according to the first or second aspect when executed by a processor.

It is to be understood that both the above general description and the following detailed description are merely exemplary and explanatory and may not limit the examples of the disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the examples of the disclosure.

DETAILED DESCRIPTION

Description will here be made in detail to examples, instances of which are illustrated in the accompanying drawings. When the following description refers to the accompanying drawings, the same numbers in different accompanying drawings refer to the same or similar elements unless otherwise indicated. The implementation modes described in the following examples do not represent all implementation modes consistent with the examples of this disclosure. Rather, they are merely instances of apparatus and methods consistent with some aspects of the examples of the disclosure as described in detail in the appended claims.

The term used in the examples of the disclosure is for the purpose of describing particular examples merely and is not intended to be restrictive of the examples of the disclosure. As used in the examples and the appended claims of the disclosure, singular forms "a", "said" and "the" are intended to include plural forms as well, unless the context clearly indicates otherwise. it is to be understood that the term "and/or" as used here refers to and encompasses any or all possible combinations of one or more of the associated listed items.

It is to be understood that although the terms first, second, third, etc., may be employed in the examples of the disclosure to describe various information, such information should not he limited to these terms. These terms are merely used to distinguish the same type of information from each other. For example, first information could also be referred to as second information, and similarly, second information could also be referred to as first information, without departing from the scope of the examples of the disclosure. Depending on the context, the word "if" as used here may be interpreted as "at the time of" or "when", or "in response to determining", The disclosure relates to, but is not limited to, the technical field of radio communication, and in particular to an information transmission method and a communication device, and a storage medium.

Figure 1:
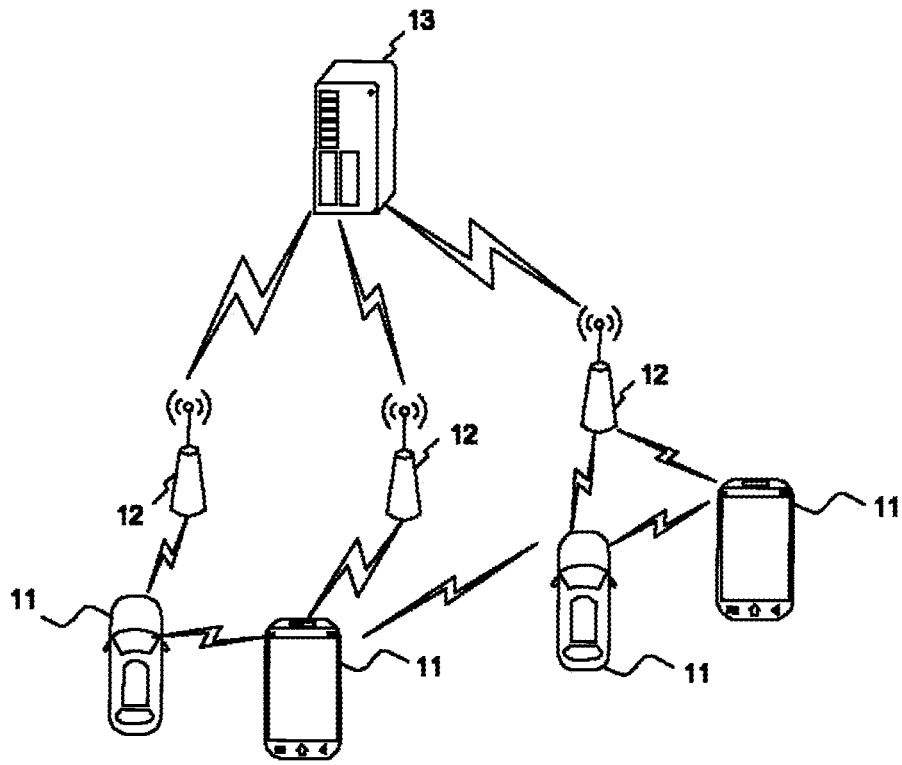
FIG. 1 is a structural schematic diagram of a radio communication system according to an example.

FIG. 1 shows a structural schematic diagram of a radio communication system provided in an example of the disclosure. As shown in FIG. 1, the radio communication system is based on cellular mobile communication, and may include: several terminals 11 and several base stations 12.

The terminals 11 may be devices providing voice and: or data connectivity for a user. The terminals 11 may communicate with one or more core networks via a radio access network (RAN). The terminals 11 may be Internet of Things terminals, such as sensor devices, mobile phones (or "cellular" phones), and computers with Internet of Things terminals, for example, stationary, portable, pocket, handheld, intra-computer, or vehicle-mounted apparatuses. .For example, the terminals 11 may be a station (STA), a subscriber unit, a subscriber station, a mobile station, a mobile, a remote station, an access point, a remote terminal, an access terminal, a user terminal, a user agent, user equipment (UE), or a user terminal. Alternatively, the terminals 11 may also be unmanned aerial vehicles. Alternatively, the terminals 11 may also be vehicle-mounted devices, for example, electronic control units having a radio communication function, or radio communication devices externally connected to the electronic control units. Alternatively, the terminals 11 may also be roadside devices, for example, street lamps, signal lamps, etc. having a radio communication function.

Each of the base stations 12 may be a network-side device in the radio communication system. The radio communication system may be a 4th generation mobile communication (4G) system, which is also called a long term evolution (LTE) system. Alternatively, the radio communication system may also be a 5th generation mobile communication (5G) system, which is also called a new radio (NR) system or a 5G NR system. Alternatively, the radio communication system may also be a next generation system following the 5G system. An access network of the 5G system may be called a new generation-radio access network (NG-RAN), or a massive machine-type communication (MTC) system.

Each of the base stations 12 may be an evolved node B (eNB) employed in the 4G system. Alternatively, each of the base stations 12 may be a next generation node B (gNB) employing a centralized-distributed architecture in the 5G system. When employing the centralized-distributed architecture, each of the base stations 12 generally includes a central unit (CU) and at least two distributed units (DUs). The central unit is provided with a protocol stack of a packet data convergence protocol (PDCP) layer, a radio link control (RLC) layer, and a media access control (MAC) layer. Each of the distributed units is provided with a protocol stack of a physical (PHY) layer. Specific implementations of the base stations 12 are not limited to the examples of the disclosure.

The base stations 12 are in radio connection with the terminals 11 through a wireless radio. In different implementations, the wireless radio is based on a standard of the 4th generation mobile communication (4G), or a standard of the 5th generation mobile communication (5G), and is a new radio, for example. Alternatively, the wireless radio may also be based on a standard of a next generation mobile communication following 5G.

In some examples, an end to end (E2E) connection may also be established between the terminals 11. For example, scenarios such as vehicle to vehicle (V2V) communication, vehicle to infrastructure (V2I) communication, and vehicle to pedestrian (V2P) communication in vehicle to everything (V2X) communication are provided.

In some examples, the radio communication system described above may further encompass a network management device 13.

Several base stations 12 are each connected with the network management device 13. The network management device 13 may be a core network device in the radio communication system. For example, the network management device 13 may be a mobility management entity (MME) in an evolved packet core (EPC). Alternatively, the network management device may also be another core network device, such as a serving gateway (SGW), a public data network gateway (PGW), a policy and charging rules function (PCRF), a home subscriber server (HSS), etc. An implementation form of the network management device 13 is not limited to the examples of the disclosure.

Execution bodies related to the examples of the disclosure include, but are not limited to, user equipment (UE) such as a terminal supporting 5G positioning, a base station of 5G cellular mobile communication, a core network of 5G cellular mobile communication, etc.

In some positioning technologies, a positioning reference signal (PRS) is introduced to position the user equipment. During positioning, a base station needs to send the PRS to the user equipment. The user equipment needs to receive not only the PRS of a serving cell, but also the PRS of the neighboring cell. The PRS of the serving cell and the PRS of the adjacent cell may interfere with each other. With a near-far effect, the PRS of the adjacent cell received by the user equipment may be weak, or even the PRS of the adjacent cell may not be detected.

Application scenarios of the examples of the disclosure are that, for positioning reference signal (PRS) interference, an interference coordination mechanism, i.e., a PRS muting mechanism, is provided in the related art, and PRS interference may be reduced by means of the PRS muting mechanism. Presently, PRS configuration may be considered as static, such that interference of a PRS may be reduced by means of operation administration and maintenance (OAM) of the PRS configuration to the network. For example, the PRS muting mechanism is utilized, and a core network may configure the PRS of each cell to be transmitted orthogonally in a time domain by means of the OAM, to completely avoid PRS interference, Alternatively, the core network may also set the PRS configuration of each cell to be the same by means of the OAM, to reduce PRS interference.

In view that different UE has positioning requirements, resulting in different PRS configuration requirements to the network, dynamic PRS configuration is provided, that is, the network may dynamically change PRS configuration according to different positioning requirements. With dynamic updating of PRS configuration, new PRS interference problems are brought.

Figure 2:
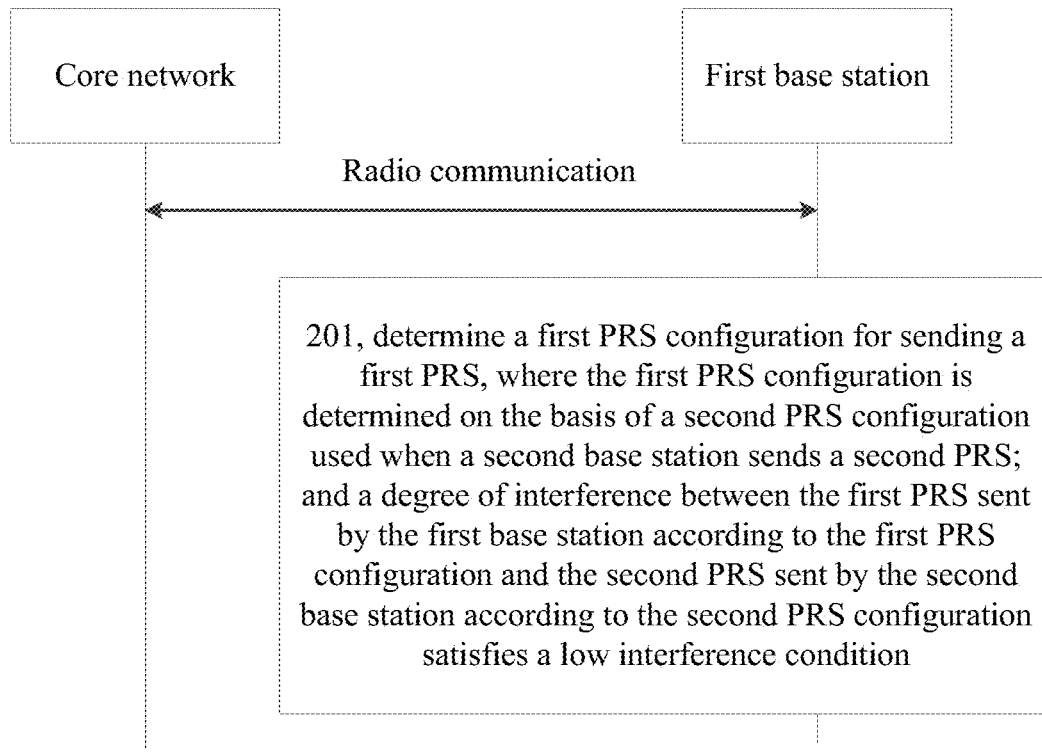
FIG. 2 is a schematic flow chart of an information transmission method according to an example.

As shown in FIG. 2, the present example provides an information transmission method, which may be applied to a first base station of a radio communication system. The information transmission method may include:

step 201, determine a first PRS configuration for sending a first PRS, where the first PRS configuration is determined based on a second PRS configuration used when a second base station sends a second PRS; and a degree of interference between the first PRS sent by the first base station according to the first PRS configuration and the second PRS sent by the second base station according to the second PRS configuration satisfies of a low interference condition.

A radio communication system here may include, but is not limited to, a 5G cellular mobile communication system. The base station may be a base station in the radio communication system. The core network may be a core network in the radio communication system.

In the radio communication system, the user equipment may be positioned based on the PRS. For example, the user equipment may measure the time of arrival (TOA) of the PRS sent by a plurality of positioning base stations respectively, utilizes a difference of the TOA of a plurality of PRS, and the arrival party of each PRS, and uses modes of triangulation positioning, etc. for positioning.

The first base station here may be different from the second base station. The second base station may be a base station that sends the PRS for positioning measurements by the user equipment. The second base station may be one or more. The first base station may be a base station that interferes with the PRS sent by the second base station.

The PRS configuration may include at least one of a time domain resource configuration in Which the base station sends the PRS, a frequency domain resource configuration in which the base station sends the PRS, a spatial domain resource configuration in which the base station sends the PRS, a power configuration in which the base station sends the PRS, etc. The first PRS configuration and/or the second PRS here may be all. configurations in which the base station sends the PRS or may be partial configurations in which the base station sends the PRS. For example, the first PRS configuration and/or the second PRS configuration may be a PRS muting configuration or may be any one of a time domain resource configuration, a frequency domain resource configuration, a spatial domain resource configuration of a PRS. The second PRS configuration here may be a full configuration or a partial configuration in which the second base station sends the PRS. For example, the second PRS configuration may be a time-domain resource configuration in which the second base station sends the PRS.

When being subjected to PRS-based positioning, the user equipment may receive the PRS of the second base station and/or the PRS of the first base station, and the user equipment only needs to perform positioning measurement on the PRS of the second base station during positioning. Thus, when the user equipment is positioned based on the PRS of the second base station, the PRS of the first base station may generate signal interference to the PRS of the second base station. For example, the PRS of the first base station may generate co-frequency interference to the PRS of the second base station.

The first base station here may determine the first PRS configuration based on the second PRS configuration, such that a degree of interference between the PRS sent by the first base station using the first PRS configuration and the PRS sent by the second base station using the second PRS configuration satisfies of a low interference condition. The satisfies of a low interference condition here includes at least one of:

there being no interference between the PRS sent by the first base station using the first PRS configuration and the PRS sent by the second base station using the second PRS configuration; and the degree of no interference between the PRS sent by the first base station using the first PRS configuration and the PRS sent by the second base station using the second PRS configuration is lower than an interference threshold.

There being no interference between the PRS sent by the first base station using the first PRS configuration and the PRS sent by the second base station using the second PRS configuration includes at least one of:

the PRS sent by the first base station using the first PRS configuration is orthogonal to the PRS sent by the second base station using the second PRS configuration in a time domain; and a signal coverage area of the PRS sent by the first base station using the first PRS configuration does not overlap a signal coverage area of the PRS sent by the second base station using the second PRS configuration.

For example, the first PRS configuration may be set based on the second PRS configuration by means of PRS interference coordination, etc. For example, a muting configuration in the first PRS configuration may be set based on the second PRS configuration. The muting configuration here may be a configuration maintaining muting and may be a configuration in which the first base station does not send the PRS. The muting configuration in the first PRS configuration is determined according to the second PRS configuration, and the first base station may reduce or avoid interference with the PRS of the second base station when applying the muting configuration.

When the second PRS configuration is changed, the first PRS configuration may be re-determined based on the changed second PRS configuration.

Thus, the first PRS configuration may be set based on the second PRS configuration, and the degree of interference between the PRS sent by the first base station and the PRS sent by the second base station may still satisfy the low interference condition under the situation that the second PRS configuration is changed, such that flexibility of the first PRS configuration and adaptability to different scenarios are improved, interference between the PRS is reduced, and a PRS positioning success rate and positioning precision of the user equipment are further improved.

Figure 3:
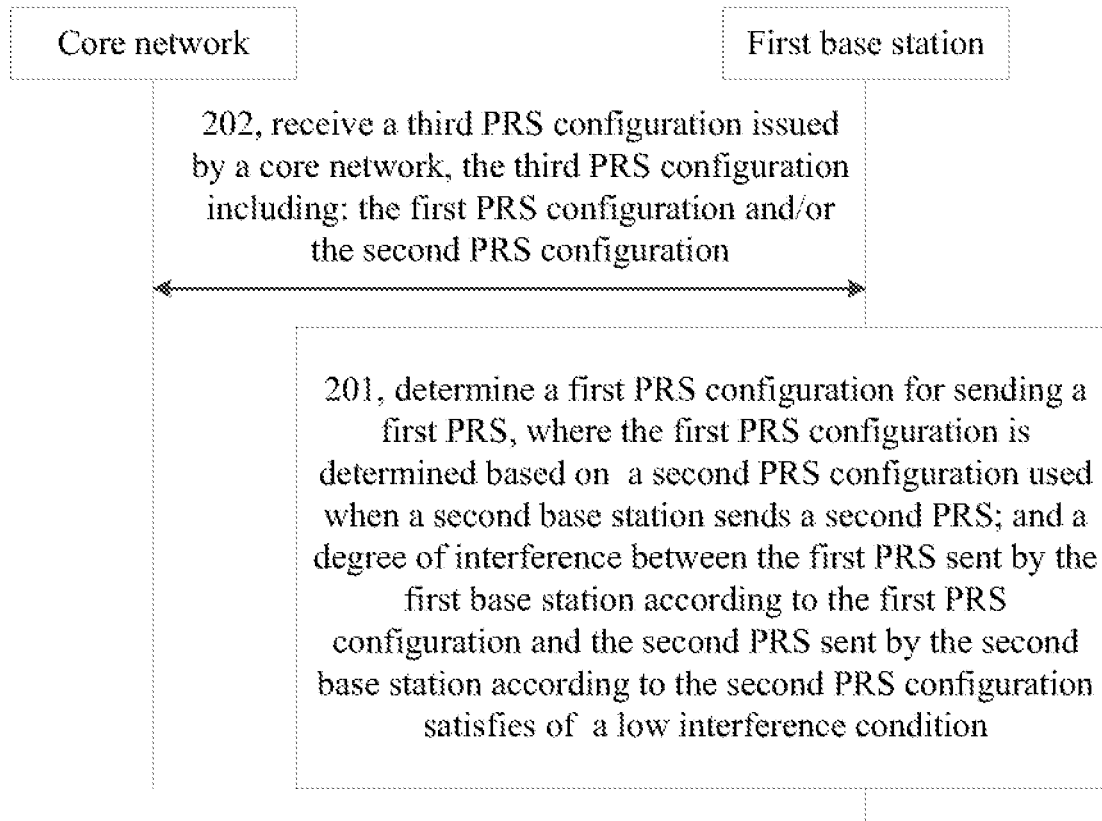
FIG. 3 is a schematic flow chart of another information transmission method according to an example.

In an example, as shown in FIG. 3, the information transmission method may further include:

step 202, receive a third PRS configuration issued by a core network, the third PRS configuration including: the first PRS configuration and/or the second PRS configuration; and determining a first PRS configuration for sending a first PRS includes:

obtain the first PRS configuration issued by the core network and generated based on the second PRS configuration;

or, determine the first PRS configuration according to the second PRS configuration issued by the core network;

or, obtain at least one candidate first PRS configuration issued by the core network and generated based on. the second PRS configuration, and the second PRS configuration; and determine the first PRS configuration according to the second PRS configuration issued by the core network, the first PRS configuration being one of the at least one candidate first PRS configuration.

That is, the first PRS configuration may be determined by the core network according to the second PRS configuration of the second base station; and in this case, the core network sends the determined first PRS configuration to the first base station. It may also be that the core network sends the second PRS configuration of the second base station to the first base station and is determined by the first base station; and in this case, the core network sends the second PRS configuration for determining the first PRS configuration to the first base station. It may further be that the core network sends the second PRS configuration of the second base station together with the at least one candidate first PRS configuration to the first base station, where the candidate first PRS configuration is determined by the core network based on the second PRS configuration; thus, after receiving the second PRS configuration and the at least one candidate first PRS configuration, the first base station may select the first PRS configuration used by the first base station from the at least one candidate first PRS configuration according to the second PRS configuration and an own condition; and certainly, if none of the at least one candidate first PRS configuration sent by all core networks is applicable, the first base station may negotiate with the core network, or determine the first PRS configuration that the first base station uses.

In all examples of the disclosure, the first PRS configuration may be: a numerical value of the configuration in which the first base station sends the PRS; and the first base station and or the second base station may determine the first PRS configuration directly after receiving the value of the first PRS configuration.

The first PRS configuration may further be used for indicating a corresponding identity of the first PRS configuration, so as to make a receiving end determine the first PRS configuration according to a corresponding relation between a preset identity and the first PRS configuration. The corresponding relation between the preset identity and the first PRS configuration may be determined based on a protocol; and may further be sent by the core network to the first base station and/or the second base station.

The first PRS configuration may further be used for computing one or more parameters of the first PRS configuration according to a preset formula, where the preset formula may be determined based on a protocol; and may further be sent by the core network to the first base station and/or the second base station.

The first PRS configuration may further be used for computing one or more parameters of the first PRS configuration according to a preset formula, where the preset formula may be determined based on a protocol; and may further be sent by the core network to the first base station and/or the second base station.

In all examples of the disclosure, the second PRS configuration may be: a numerical value of the configuration in which the second base station sends the PRS; and the first base station and/or the second base station may determine the second PRS configuration directly after receiving the numerical value of the second PRS configuration.

The second FRS configuration may further be used for indicating a corresponding second PRS configuration identity, so as to make the receiving end determine the second PRS configuration according to a corresponding relation between the preset identity and the second PRS configuration. The corresponding relation between the preset identity and the second PRS configuration may be determined based on a protocol; and may further be sent by the core network to the first base station and/or the second base station.

The second PRS configuration may further be used for computing one or more parameters of the second PRS configuration according to a preset formula, where the preset formula may be determined based on a protocol; and may further be sent by the core network to the first base station and/or the second base station.

The second PRS configuration may further be used for computing one or more parameters of the second PRS configuration according to a preset formula, where the preset formula may be determined based on a protocol; and may further be sent by the core network to the first base station and/or the second base station.

The third PRS configuration received from the core network here may be a PRS configuration sent by a location management function (LMF) in the core network.

The core network may first determine the first base station that needs to receive the first PRS configuration or the second PRS configuration. The core network may determine the first base station that may interfere with the PRS of the second base station based on a geographic position of the second base station, and sends the first PRS configuration or the second PRS configuration to the first base station.

The first PRS configuration sent by the core network may be a PRS configuration determined by the core network and completing PRS interference coordination with the second PRS configuration. After receiving the first PRS configuration, the first base station may be directly applied to the sending of the PRS, that is, the PRS is sent based on resources of the first PRS configuration, so as to reduce interference with the PRS sent by the second base station.

The core network determines the first PRS configuration, and when there are a plurality of first base stations, the core network may uniformly deploy the first PRS configuration, such that a degree of interference between the PRS of each first base station and the PRS of the second base station satisfies of a low interference condition, and configuration efficiency and configuration consistency of the first PRS configuration are improved. When there are a plurality of first base stations, the first PRS configuration of each first base station may be different, and may be configured according to service requirements of the user equipment served by each first base station. The degree of interference between the first PRS configuration of each first base station and the PRS of the second base station satisfies the low interference condition.

The core network may also send the second PRS configuration to the first base station. The first base station determines the first PRS configuration after receiving the second PRS configuration, and sends the PRS according to the first PRS configuration, such that interference with the PRS sent by the second base station is reduced.

The first PRS configuration is determined by the first base station, and the first base station may determine the first PRS configuration which is adapted to a self-positioning service condition and satisfies a PRS interference coordination condition with the second base station at the same time based on a positioning requirement of the UE served by the first base station and in combination with the second PRS configuration sent by the core network, such that the first PRS configuration is more adaptive.

In an example, determining the first PRS configuration according to the second PRS configuration issued by the core network includes:

carrying out PRS interference coordination according to the second PRS configuration, to determine the first PRS configuration.

The first base station may perform PRS interference coordination on the PRS configuration of the first base station with against the second PRS configuration, to obtain the first PRS configuration, such that interference generated by the first PRS configuration against the second PRS configuration satisfies the low interference condition.

For example, the first base station may set the first PRS configuration, such that the PRS sent by the first base station using the first PRS configuration is orthogonal to the PRS sent by the second base station using the second PRS configuration in a time domain. Thus, mutual interference between the PRS sent by the first base station using the first PRS configuration and the PRS sent by the second base station using the second PRS configuration is reduced.

In an example, the second PRS configuration is determined based on a positioning service requirement of user equipment.

The second PRS configuration is a PRS configuration of the second base station and is determined based on the positioning service requirement of the user equipment served by the second base station.

The user equipment has different requirements for positioning precision due to different positioning service requirements. For example, the demand for positioning precision in pedestrian navigation is higher than that in vehicle navigation. PRS configurations are different for different positioning service requirements. Thus, the second base station may send the PRS based on the second PRS configuration determined by the positioning service requirement of the user equipment served by the second base station. The core network may also determine the second PRS configuration based on the positioning service requirement of the user equipment served by the second base station. The determination of the second PRS configuration based on the positioning service requirement here may be: determining the second PRS configuration on the basis that the positioning scenario needs positioning precision, and/or based on positioning overhead that the network or user equipment may bear.

Thus, the second PRS configuration may satisfy different positioning service requirements of the user equipment. Further, when the user equipment is positioned based on different positioning service requirements, interference of the PRS sent by the first base station may satisfy the low interference condition and improve positioning precision.

In an example, step 202 may include:

receive a new radio interface positioning protocol A (NRPPa) message carrying the third PRS configuration.

The NRPPa message here may be a newly defined NRPPa message. For example, a new NRPPa message named positioning information update request may be defined to carry the first PRS configuration or the second PRS configuration. The NRPPA message may only include an IE carrying the third PRS configuration.

The NRPPa message may also be an existing NRPPa message, and may carry the first PRS configuration or the second PRS configuration in reserved bits or newly added bits of an existing NRPPa message.

In an example, the NRPPa message includes at least one of the following information element (IE):

a first IE including the third PRS configuration; and a second IE including indication information for requesting positioning information.

The first IE here is different from the second IE. The first IE may be a newly added IE in an existing NRPPa message, and the newly added IE is used to carry the first PRS configuration or the second PRS configuration; and an original IE may still carry indication information for requesting the positioning information. For example, IE carrying PRS configuration information may be added to an existing positioning information request or an observed time difference of arrival (OTDOA) information request.

The third PRS configuration may further be set in reserved bits of the second IE. Thus, the utilization efficiency of the existing NRPPa message may be improved, development difficulty caused by newly added NRPPa messages is reduced, and the complexity of information interaction generated by the plurality of NRPPa messages is reduced.

In an example, the method further includes:

send an indication of reception success in response to reception success of the third PRS configuration;

send an indication of reception .failure in response to reception failure of the third PRS configuration;

send feedback information in response to the third PRS configuration issued by the core network, the feedback information being used for indicating that the first PRS configuration is successfully determined according to the second PRS configuration issued by the core network;

send feedback information in response to the third PRS configuration issued by the core network, the feedback information. being used for indicating that the first PRS configuration is not successfully determined according to the second PRS configuration issued by, the core network; and successfully determine the first PRS configuration in response to the third PRS configuration issued by the core network, and send the first PRS configuration.

After receiving the third PRS configuration, the first base station may send feedback information to the core network.

If the third PRS configuration is successfully received, the first base station may send a receive success indication. If the third PRS configuration fails to be received, the first base station may send a receive failure indication. The core network may determine whether the third PRS configuration is successfully received based on the feedback information. The third PRS configuration here may be either the first PRS configuration or the second PRS configuration.

In response to failure of receiving the third PRS configuration, the core network may re-transmit the third PRS configuration to the first base station. Thus, the first base station may receive third PRS configuration information re-transmitted by the core network. The third PRS configuration here may be either the first PRS configuration or the second PRS configuration.

In response to determination of the first PRS configuration by the first base station, the first PRS configuration may be returned to the core network.

In response to successful determination of the first PRS configuration by the first base station according to the second PRS configuration issued by the core network, a first acknowledgement message may be sent to the core network, indicating that the first base station has determined the first PRS configuration. Or, the first base station sends the determined first PRS configuration to the core network. Or, the first acknowledgement message and the first PRS configuration are sent to the core network at the same time.

In response to the successful determination of the first PRS configuration by the first base station according to the second PRS configuration issued by the core network, a second acknowledgement message may be sent to the core network, indicating that the first base station has not determined the first PRS configuration.

In response to the failure determination of the first PRS configuration by the first base station according to the second PRS configuration issued by the core network, the core network may determine the first PRS configuration by means of PRS interference coordination for the second PRS configuration and send the first PRS configuration to the first base station.

In an example, the third PRS configuration includes at least one of:

a PRS bandwidth configuration, a PRS configuration index configuration, a PRS muting configuration, a PRS identity configuration, and a PRS sending occasion identity configuration.

The third PRS configuration may include a configuration of a time domain in which the base station sends the PRS, a configuration of a frequency domain resource, etc. The third PRS configuration may be a full configuration in which the base station sends the PRS or a partial configuration in which the base station sends the PRS.

Figure 4:
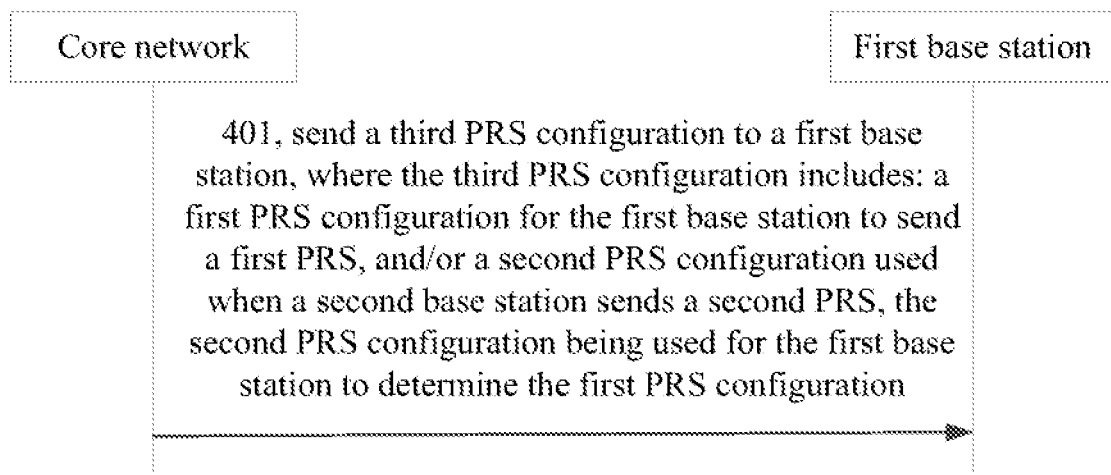
FIG. 4 is a schematic flow chart of another information transmission method according to an example.

As shown in FIG. 4, the present example provides an information transmission method, which is applied to a core network of a radio communication system. The information transmission method may include:

step 401, send a third PRS configuration to a first base station, where the third PRS configuration includes: a first PRS configuration for the first base station to send a first PRS, or a second PRS configuration used when a second base station sends a second PRS, the second PRS configuration being used for the first base station to determine the first PRS configuration, and a degree of interference between the first PRS sent by the first base station using the first PRS configuration and the second PRS sent by the second base station using the second PRS configuration satisfies of a low interference condition.

A radio communication system here may include, but is not limited to, a 5G cellular mobile communication system. The base station may be a base station in the radio communication system. The core network may be a core network in the radio communication system.

In the radio communication system, user equipment may be positioned based on the PRS. For example, the user equipment may measure TOA of the PRS sent by a plurality of positioning base stations respectively, utilizes a difference of the TOA of a plurality of PRS, and the arrival party of each PRS, and uses modes of triangulation positioning, etc. for positioning.

The first base station here may be different from the second base station. The second base station may be a base station that sends the PRS for positioning measurements by the user equipment. The second base station may be one or more. The first base station may be a base station that generates PRS interference on the PRS of the second base station received by the user equipment.

The PRS configuration may include at least one of a time domain resource configuration in which the base station sends the PRS, a frequency domain resource configuration in which the base station sends the PRS, a spatial domain resource configuration in which the base station sends the PRS, a power configuration in which the base station sends the PRS, etc. The first PRS configuration and/or the second PRS here may be all configurations in which the base station sends the PRS or may be partial configurations in which the base station sends the PRS. For example, the first PRS configuration and/or the second PRS configuration may be a PRS muting configuration or may be any one of a time domain resource configuration, a frequency domain resource configuration, a spatial domain resource configuration of a PRS. The second PRS configuration here may be a full configuration or a partial configuration in which the second base station sends the PRS. For example, the second PRS configuration may be a time-domain resource configuration in which the second base station sends the PRS.

When being subjected to PRS-based positioning, the user equipment may receive the PRS of the second base station and/or the PRS of the first base station, and the user equipment only needs to perform positioning measurement on the PRS of the second base station during positioning. Thus, when the user equipment is positioned based on the PRS of the second base station, the PRS of the first base station may generate signal interference to the PRS of the second base station. For example, the PRS of the first base station may generate co-frequency interference to the PRS of the second base station.

The first base station here may determine the first PRS configuration based on the second PRS configuration, such that a degree of interference between the PRS sent by the first base station using the first PRS configuration and the PRS sent by the second base station using the second PRS configuration satisfies of a low interference condition. The satisfies of a low interference condition here includes at least one of:

There is no interference between the PRS sent by the first base station using the first PRS configuration and the PRS sent by the second base station using the second PRS configuration; and The degree of no interference between the PRS sent by the first base station using the first PRS configuration and the PRS sent by the second base station using the second PRS configuration is lower than an interference threshold.

There being no interference between the PRS sent by the first base station using the first PRS configuration and the PRS sent by the second base station using the second PRS configuration includes at least one of:

the PRS sent by the first base station using the first PRS configuration is orthogonal to the PRS sent by the second base station using the second PRS configuration in a time domain; and a signal coverage area of the PRS sent by the first base station using the first PRS configuration does not overlap a signal coverage area of the PRS sent by the second base station using the second PRS configuration.

For example, the first PRS configuration may be set based on the second PRS configuration by means of PRS interference coordination, etc. For example, a muting configuration in the first PRS configuration may be set based on the second PRS configuration. The muting configuration here may be a configuration maintaining muting and may be a configuration in which the first base station does not send the PRS. The muting configuration in the first PRS configuration is determined according to the second PRS configuration, and the first base station may reduce or avoid interference with the PRS of the second base station when applying the muting configuration.

When the second PRS configuration is changed, the first PRS configuration may be re-determined based on the changed second PRS configuration.

Thus, the first PRS configuration may be set based on the second PRS configuration, and the degree of interference between the PRS sent by the first base station and the PRS sent by the second base station may still satisfy the low interference condition under the situation that the second PRS configuration is changed, such that flexibility of the first PRS configuration and adaptability to different scenarios are improved, interference between the PRS is reduced, and a PRS positioning success rate and positioning precision of the user equipment are further improved.

The third PRS configuration received from the core network here may be a PRS configuration sent by an LMF in the core network.

The core network may first determine the first base station that needs to receive the first PRS configuration or the second PRS configuration. The core network may determine the first base station that may interfere with the PRS of the second base station based on a geographic position of the second base station, and sends the first PRS configuration or the second PRS configuration to the first base station.

The first PRS configuration sent by the core network may be a PRS configuration determined by the core network and completing PRS interference coordination with the second PRS configuration. After receiving the first PRS configuration, the first base station may be directly applied to the sending of the PRS, that is, the PRS is sent based on resources of the first PRS configuration, so as to reduce interference with the PRS sent by the second base station.

The core network determines the first PRS configuration, and when there are a plurality of first base stations, the core network may uniformly deploy the first PRS configuration, such that a degree of interference between the PRS of each first base station and the PRS of the second base station satisfies of a low interference condition, and configuration efficiency and configuration consistency of the first PRS configuration are improved. When there are a plurality of first base stations, the first PRS configuration of each first base station may be different, and may be configured according to the service requirements of the user equipment served by each first base station. The degree of interference between the first PRS configuration of each first base station and the PRS of the second base station satisfies the low interference condition. When there are a plurality of first base stations, the first PRS configuration of each first base station may be the same.

The core network may also sent the second PRS configuration to the first base station. The first base station determines the first PRS configuration after receiving the second PRS configuration, and sends the PRS according to the first PRS configuration, such that interference with the PRS sent by the second base station is reduced.

The first PRS configuration is determined by the first base station, and the first base station may determine the first PRS configuration which is adapted to a self-positioning service condition and satisfies a PRS interference coordination condition with the second base station at the same time based on a positioning requirement of the UE served by the first base station and in combination with the second PRS configuration sent by the core network, such that the first PRS configuration is more adaptive.

In an example, sending the third PRS configuration to the first base station includes:

generating the first PRS configuration according to the second PRS configuration, and sending the first PRS configuration to the first base station;

or, sending the second PRS configuration to the first base station, so as to make the first base station determine the first PRS configuration according to the second PRS configuration;

or, sending at least one candidate first PRS configuration generated according to the second PRS configuration and the second PRS configuration, to the first base station, so as to make the first base station determine the first PRS configuration according to the second PRS configuration, the first PRS configuration being one of the at least one candidate first PRS configuration.

That is, the first PRS configuration may be determined by the core network according to the second PRS configuration of the second base station; and in this case, the core network sends the determined first PRS configuration to the first base station. It may also be that the core network sends the second PRS configuration of the second base station to the first base station and is determined by the first base station; and in this case, the core network sends the second PRS configuration for determining the first PRS configuration to the first base station. It may further be that the core network sends the second PRS configuration of the second base station together with the at least one candidate first PRS configuration to the first base station, where the candidate first PRS configuration is determined by the core network based on the second PRS configuration; thus, after receiving; the second PRS configuration and the at least one candidate first PRS configuration, the first base station may select the first PRS configuration used by the first base station from the at least one candidate first PRS configuration according to the second PRS configuration and an own condition; and certainly, if none of the at least one candidate first PRS configuration sent by all core networks is applicable, the first base station may negotiate with the core network, or determine the first PRS configuration that the first base station uses.

In all examples of the disclosure, the first PRS configuration may be: a numerical value of the configuration in which the first base station sends the PRS; and the first base station and/or the second base station may determine the first PRS configuration directly upon receiving the value of the first PRS configuration.

The first PRS configuration may further be used for indicating a corresponding identity of the first PRS configuration, so as to make a receiving end determine the first PRS configuration according to a corresponding relation between a preset identity and the first PRS configuration. The corresponding relation between the preset identity and the first PRS configuration may be determined based on a protocol; and may further be sent by the core network to the first base station anchor the second base station.

The first PRS configuration may further be used for computing one or more parameters of the first PRS configuration according to a preset formula, where the preset formula may be determined based on a protocol; and may further be sent by the core network to the first base station and/or the second base station.

In all examples of the disclosure, the second PRS configuration may be: a numerical value of the configuration in which the second base station sends the PRS; and the first base station and/or the second base station may determine the second PRS configuration directly after receiving the numerical value of the second PRS configuration.

The second PRS configuration may further be used for indicating a corresponding second PRS configuration identity, so as to make the receiving end determine the second PRS configuration according to a corresponding relation between the preset identity and the second PRS configuration. The corresponding relation between the preset identity and the second PRS configuration may be determined based on a protocol; and may further be sent by the core network to the first base station and/or the second base station.

The second PRS configuration may further be used for computing one or more parameters of the second PRS configuration according to a preset formula, where the preset formula may be determined based on a protocol; and may further be sent by the core network to the first base station and/or the second base station.

Figure 5:
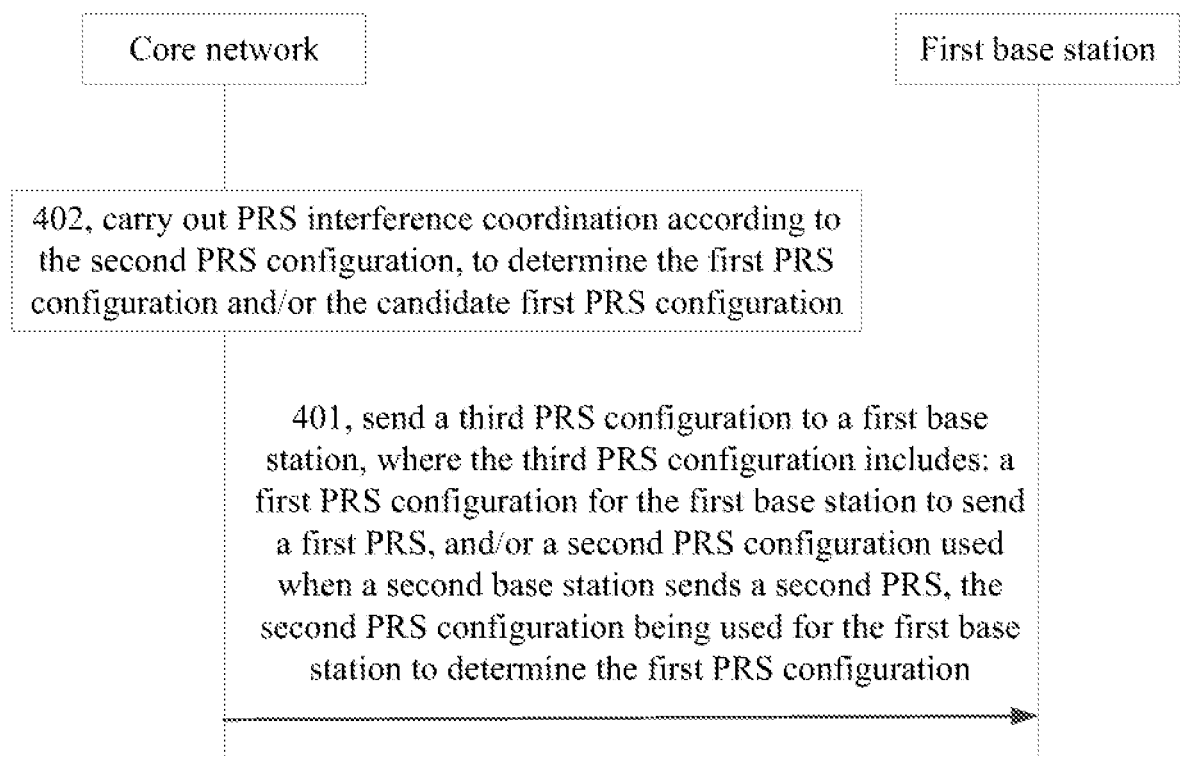
FIG. 5 is a schematic flow chart of another information transmission method according to an example.

In an example, as shown in FIG. 5, before the sending the first PRS configuration to the first base station in response to the third PRS configuration being the first PRS configuration, the method further includes:

step 402, carry out PRS interference coordination according to the second PRS configuration, to determine the first PRS configuration and/or the candidate first PRS configuration.

PRS interference coordination is carried out for the second PRS configuration, to obtain the first PRS configuration and/or the candidate first PRS configuration, such that interference of the first base station sending the first PRS by using the first PRS configuration and/or the candidate first PRS configuration to the second base station sending the second PRS by using the second PRS configuration satisfies of a low interference condition.

The first base station may perform PRS interference coordination on the PRS configuration of the first base station against the second PRS configuration, to obtain the first PRS configuration.

For example, the first base station may set the first PRS configuration, such that the PRS sent by the first base station using the first PRS configuration is orthogonal to the PRS sent by the second base station using the second PRS configuration in a time domain. Thus, mutual interference between the PRS sent by the first base station using the first PRS configuration and the PRS sent by the second base station using the second PRS configuration is reduced.

In an example, the information transmission method may further include:

determining the second PRS configuration based on a positioning service requirement of user equipment.

The second PRS configuration is a PRS configuration of the second base station and is determined based on the positioning service requirement of the user equipment served by the second base station.

The user equipment has different requirements for positioning precision due to different positioning service requirements. For example, the demand for positioning precision in pedestrian navigation is higher than that in vehicle navigation. PRS configurations are different for different positioning service requirements. Thus, the second base station may send the PRS based on the second PRS configuration determined by the positioning service requirement of the user equipment served by the second base station. The core network may also determine the second PRS configuration based on the positioning service requirement of the user equipment served by the second base station. The determination of the second PRS configuration based on the positioning service requirement here may be: determining the second PRS configuration on the basis that the positioning scenario needs positioning precision, and/or based on positioning overhead that the network or user equipment may bear.

Thus, the second PRS configuration may satisfy different positioning service requirements of the user equipment. Further, when the user equipment is positioned based on different positioning service requirements, interference of the PRS sent by the first base station may satisfy the low interference condition and improve positioning precision.

In an example, step 401 may include:

send the third PRS configuration to the first base station that satisfies an interference condition in a radio signal measurement report reported by user equipment;

or, send the third PRS configuration to the first base station within a predetermined distance range of the second base station.

The core network may first determine the first base station.

The core network may determine the first base station according to geographic information of the second base station. For example, the base station within a predetermined distance range may interfere with the PRS of the second base station. The base station within the predetermined distance range of the second base station may be determined as the first base station.

The core network may determine the first base station according to the radio signal measurement report reported by the user equipment, which is served by the second base station and has a positioning requirement. The base station satisfying the interference condition here may be a base station whose signal strength satisfies a signal strength threshold.

In an example, the information transmission method may further include:

receive a fourth PRS configuration sent by the second base station, the fourth PRS configuration being determined based on a positioning service requirement of the user equipment; and determine the second PRS configuration according to the fourth PRS configuration.

The fourth PRS configuration here may be a configuration or a partial configuration in which the second base station sends the PRS, and the second base station may send the fourth PRS configuration to determine the first PRS configuration by the core network or the first base station.

The fourth PRS configuration here may be the same as the second PRS configuration. The fourth PRS configuration may also include the second PRS configuration. That is, the second PRS configuration may be part of the fourth PRS configuration.

The core network may determine the second PRS configuration from the fourth PRS configuration for PRS interference coordination, or send the determined second PRS configuration to the first base station for PRS interference coordination.

For example, the fourth PRS configuration is one or more of a time domain resource, a frequency domain resource and a space domain resource for the second base station to send the PRS. The second base station sends the fourth PRS configuration to the core network. The core network determines the time domain resource configuration in the fourth PRS configuration as the second PRS configuration. The core network may perform PRS interference coordination based on the time domain resource configuration, or send the determined time domain resource configuration to the first base station for PRS interference coordination.

in an example, step 401 may include:

send an NRPPa message carrying the third PRS configuration to the first base station.

The NRPPa message here may be a newly defined NRPPa message. For example, a new NRPPa message named positioning information update request may be defined to carry the first PRS configuration or the second PRS configuration.

The NRPPa message may also be an existing NRPPa message, and may carry the first PRS configuration or the second PRS configuration in reserved bits or newly added bits of an existing NRPPa message.

In an example, the NRPPa message includes at least one of the following IE:

a first IE including the third PRS configuration, or used for determining parameters of the third PRS configuration; and a second IE including indication information for requesting positioning information.

in all examples of the disclosure, the parameter for determining the third PRS configuration may be used for indicating a corresponding third PRS configuration identity, so as to make the receiving end determine the third PRS configuration according to a corresponding relation between the preset identity and the third PRS configuration. The corresponding relation between the preset identity and the third PRS configuration may be determined based on a protocol; and may further be sent by the core network to the first base station and/or the second base station.

The parameter for determining the third PRS configuration may further be used for computing one or more parameters of the third PRS configuration according to a preset formula, where the preset formula may be determined based on a protocol; and may further be sent by the core network to the first base station and/or the second base station.

The first IE here is different from the second IE. The first IE may be a newly added IE in an existing NRPPa message, and the newly added IE is used to carry the first PRS configuration or the second PRS configuration; and an original IE, may still carry indication information for requesting the positioning information. For example, IE carrying PRS configuration information may be added to an existing positioning information request or an OTDOA information request.

The third PRS configuration may further be set in reserved bits of the second IE. Thus, the utilization efficiency of the existing NRPPa message may be improved, development difficulty caused by newly added NRPPa messages is reduced, and the complexity of information interaction generated by a plurality of NRPPa messages is reduced.

In an example, the information transmission method may further include one of:

determine, according to a received indication of reception success, that reception of the third PRS configuration succeeds;

determine, according to a received indication of reception failure, that reception of the third PRS configuration fails;

determine, according to received feedback information, whether the first base station successfully determines the first PRS configuration according to the third PRS configuration;

receive the first PRS configuration returned by the first base station.

After receiving the third PRS configuration, the first base station may send feedback information to the core network.

If the third PRS configuration is successfully received, the first base station may send a receive success indication. If the third PRS configuration fails to be received, the first base station may send a receive failure indication. The core network may determine whether the third PRS configuration is successfully received based on the feedback information. The third PRS configuration here may be either the first PRS configuration or the second PRS configuration.

In response to the failure of receiving the third PRS configuration, the core network may re-transmit the third PRS configuration to the first base station. Thus, the first base station may receive third PRS configuration information re-transmitted by the core network. The third PRS configuration here may be either the first PRS configuration or the second PRS configuration.

In response to the determination of the first PRS configuration by the first base station, the first PRS configuration may be returned to the core network.

In response to the successful determination of the first PRS configuration by the first base station according to the second PRS configuration issued by the core network, a first acknowledgement message may be sent to the core network, indicating that the first base station has determined the first PRS configuration. Or, the first base station sends the determined first PRS configuration to the core network. Or, the first acknowledgement message and the first PRS configuration are sent to the core network at the same time.

In response to the failure determination of the first PRS configuration by the first base station according to the second PRS configuration issued by the core network, a second acknowledgement message may be sent to the core network, indicating that the first base station does not determine the first PRS configuration, In response to the failure determination of the first PRS configuration by the first base station according to the second PRS configuration issued by the core network, the core network may determine the first PRS configuration by means of PRS interference coordination for the second PRS configuration and send the first PRS configuration to the first base station.

In an example, the third PRS configuration includes at least one of:
  a PRS bandwidth configuration,
  a PRS configuration index configuration,
  a PRS muting configuration,
  a PRS identity configuration, and
  a PRS sending occasion identity configuration.

The third PRS configuration may include a configuration of a time domain in which the base station sends the PRS, a configuration of a frequency domain resource, etc. The third PRS configuration may be a full configuration in which the base station sends the PRS or a partial configuration in which the base station sends the PRS.

A specific example is provided below with reference to any of the examples described above:

1. The LMF sends a message (e.g., an NRPPa message) to a target base station, a transmission reception point (TRP), or gNB, the sent message including configuration information of the PRS, and the configuration information of the PRS being used for PRS interference coordination by the target base station.

2. occasion when the LMF sends the message: after one or more base stations change the PRS configuration due to a change of a positioning requirement of user equipment, the LMF sends the message to the target base station. Specifically, it may be that the LMF actively updates the PRS configuration of one or more base stations according to the change of the positioning requirement, or one or more base stations may include updated PRS configuration information after actively updating the PRS configuration, indicating that the PRS configuration has been changed.

3. method for determining the target base station by the LMF is as follows:
method a: the target base station is determined according to geographic information of the base station updated by the PRS configuration in step 2. For example, the target base station is a base station that is close to the base station updating the PRS configuration in geographic distance; and method b: a target base station is determined according to a measurement reporting result of UE needing to be positioned in step 2, i.e., UE needing to change the PRS configuration to be positioned, for example, a base station which may generate interference to the UE is determined according to the measurement reporting result of the UE.

4. The PRS configuration information in 1 is as follows:
A: all or part of PRS configuration information updated by the base station;
B: PRS configuration information recommended by the LMF and applied by the target base station;
C: A and B are included at the same time:
the PRS configuration information may include the following contents:
a PRS bandwidth (prsBandwidth), a PRS configuration index (prsConfigIndex), a PRS muting configuration (prsmutingconfiguration), a PRS identity (prsid), a PRS transmission occasion (prsOccasionGroup); and for example, for B, only the PRS muting configuration may be included, and the target base station only needs to apply a new PRS muting configuration to avoid or reduce PRS interference after receiving the PRS muting configuration.

5. After receiving the PRS configuration information applying the PRS interference coordination in 1, the target base station may perform the following steps:

5.1. the target base station decides new PRS configuration information of the target base station, coordinates the PRS interference problem according to the PRS configuration information provided by the LMF, and updates the PRS configuration of the target base station;

5.2. the target base station applies the PRS configuration provided by the LMF, and directly applies the PRS configuration information recommended by the LMF; and 5.3. the target base station may decide the PRS configuration of the target base station or use the PRS configuration recommended by the LMF.

6. The target base station returns an acknowledgement message to the LMF, and the acknowledgement message is as follows:

the PRS configuration information newly set by the target base station;

the target base station returning PRS configuration information confirming that LMF recommendation is used; and the target base station returning a failure/error message.

7. A message sent by the LMF to the target base station may be:

Defining a new message, such as an NRPPa message, and a positioning information update request, in which the PRS configuration information is included; and an existing message is utilized, an IE is newly added in the existing message, and the PRS configuration information is carried by the newly added IE; and for example, an carrying PRS configuration information is added in an existing positioning information request t or an OTDOA information request message.

Figure 6:
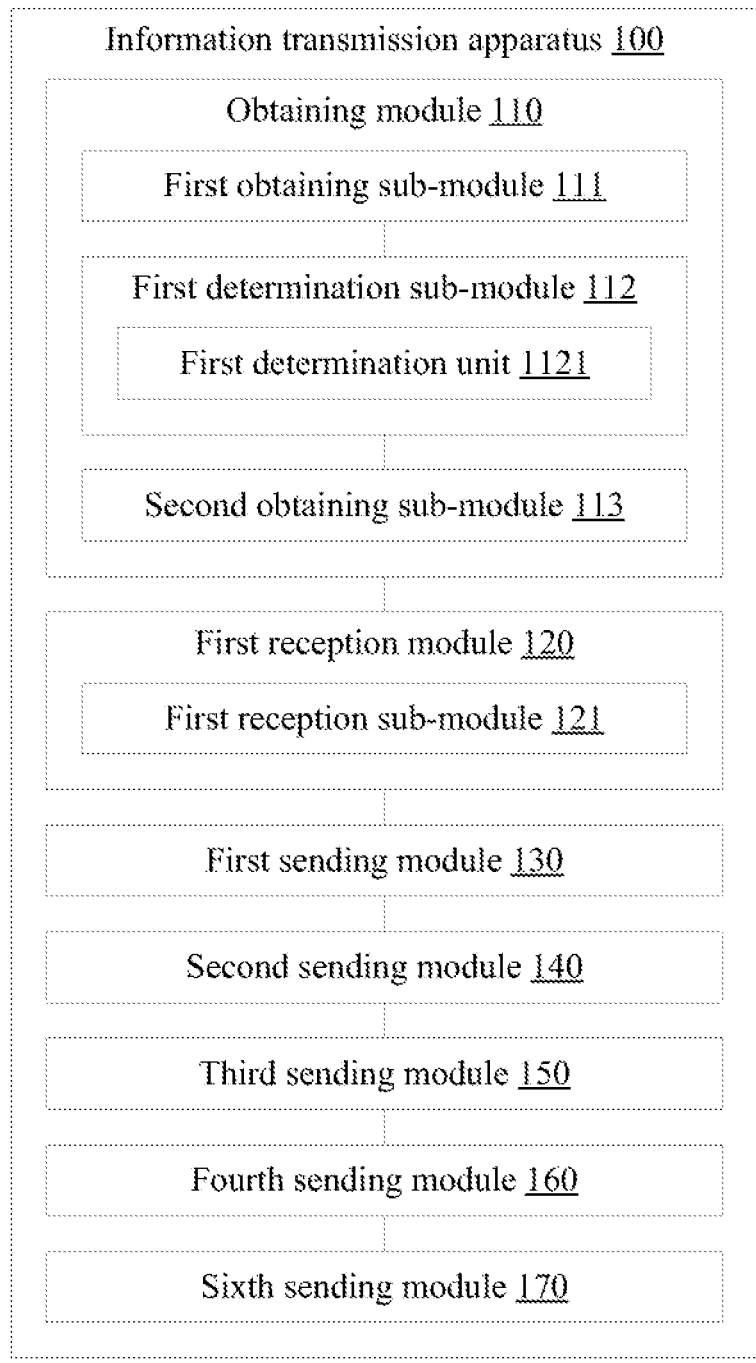
FIG. 6 is a block diagram of an information transmission apparatus according to an example.

The examples of the disclosure further provide an information transmission apparatus, which is applied to a base station. FIG. 6 is a structural schematic diagram of composition of the information transmission apparatus 100 provided in the example of the disclosure. As shown in FIG. 6, the information transmission apparatus 100 includes: a first determination module 110, where the first determination module 110 is configured to determine a first PRS configuration for sending a first PRS, the first PRS configuration being determined based on a second PRS configuration used when a second base station sends a second PRS, and a degree of interference between the first PRS sent by the first base station according to the first PRS configuration and the second PRS sent by the second base station according to the second PRS configuration satisfies of a low interference condition.

In an example, the information transmission apparatus 100 further includes:

a first reception module 120 configured to receive a third PRS configuration issued by a core network, the third PRS configuration including the first PRS configuration and/or the second PRS configuration; and the first determination module 110 includes:

a first obtaining sub-module 111 configured to obtain the first PRS configuration issued by the core network and generated based on the second PRS configuration;

or, a first determination sub-module 112 configured to determine the first PRS configuration according to the second PRS configuration issued by the core network;

or, a second obtaining sub-module 113 configured to obtain at least one candidate first PRS configuration issued by the core network and generated based on the second PRS configuration, and the second PRS configuration, and determining the first PRS configuration according to the second PRS configuration issued by the core network, the first PRS configuration being one of the at least one candidate first PRS configuration.

In an example, the first determination sub-module 112 includes:

a first determination unit 1121 configured to carry out PRS interference coordination according to the second PRS configuration, to determine the first PRS configuration.

In an example, the second PRS configuration is determined based on a positioning service requirement of user equipment, In an example, the first reception module 120 includes:

a first reception sub-module 121 configured to receive an NRPPa message carrying the third PRS configuration.

In an example, the NRPPa message includes at least one of the following IE:

a first IE including the third PRS configuration; and a second IE including indication information for requesting positioning information.

In an example, the information transmission apparatus 100 further includes one of:

a first sending module 130 configured to send an indication of reception success in response to reception success of the third PRS configuration;

a second sending module 140 configured to send an indication of reception failure in response to reception failure of the third PRS configuration;

a third sending module 150 configured to send feedback information in response to the third PRS configuration issued by the core network, the feedback information being used for indicating that the first PRS configuration is not successfully determined according to the second PRS configuration issued by the core network;

a fourth sending module 160 configured to send feedback information in response to the third PRS configuration issued by the core network, the feedback information being used for indicating that the first PRS configuration is not successfully determined according to the second PRS configuration issued by the core network; and a sixth sending module 170 configured to successfully determine the first PRS configuration in response to the third PRS configuration issued by the core network and send the first PRS configuration.

In an example, the third PRS configuration includes a PRS bandwidth configuration, and/or a PRS configuration index configuration, and/or a PRS muting configuration, and/or a PRS identity configuration, and/or a PRS sending occasion identity configuration.

Figure 7:
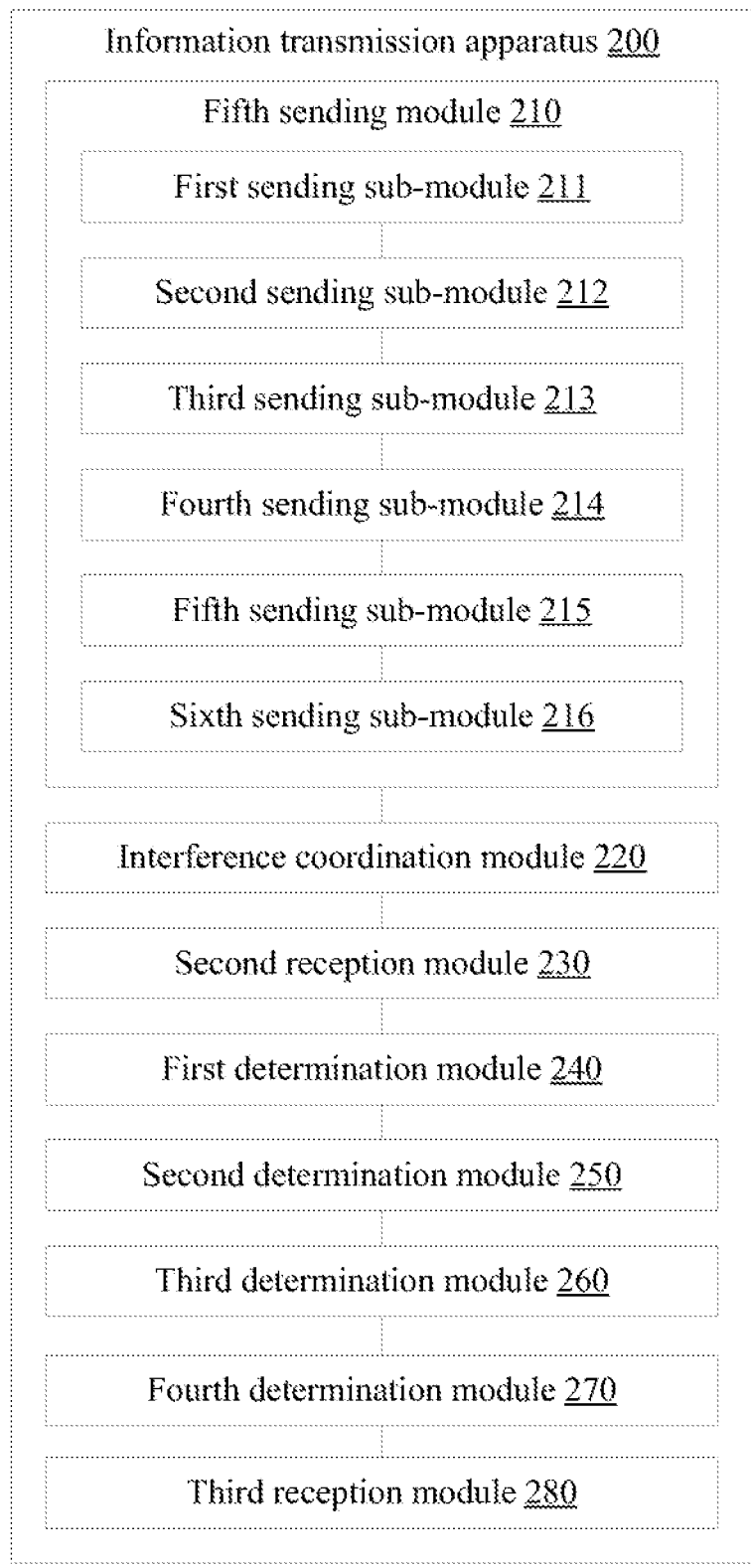
FIG. 7 is a block diagram of another information transmission apparatus according to an example.

The examples of the disclosure further provides an information transmission apparatus, which is applied to a core network. FIG. 7 is a structural schematic diagram of composition of the information transmission apparatus 200 provided in the example of the disclosure. As shown in FIG. 7, the information transmission apparatus 200 includes: a fifth sending module 210, where the fifth sending module 210 is configured to send a third PRS configuration to a first base station, the third PRS configuration including: a first PRS configuration for the first base station to send a first PRS, and/or a second PRS configuration used when a second base station sends a second PRS, the second PRS configuration being used for the first base station to determine the first PRS configuration, and a degree of interference between the first PRS sent by the first base station using the first PRS configuration and the second PRS sent by the second base station using the second PRS configuration satisfying of a low interference condition.

In an example, the fifth sending module 210 includes:

a first sending sub-module 211 configured to generate the first PRS configuration according to the second PRS configuration and send the first PRS configuration to the first base station;

or, a second sending sub-module 212 configured to send the second PRS configuration to the first base station, so as to make the first base station determine the first PRS configuration according to the second PRS configuration;

or, a third sending sub-module 213 configured to send at least one candidate first PRS configuration generated according to the second PRS configuration and the second PRS configuration, to the first base station, so as to make the first base station determine the first PRS configuration according to the second PRS configuration, the first PRS configuration being one of the at least one candidate first PRS configuration.

In an example, the information transmission apparatus 200 further includes:

a second determination module 220 configured to determine the second PRS configuration based on a positioning service requirement of user equipment.

In an example, the information transmission apparatus 200 further includes:

an interference coordination module 230 configured to carry out PRS interference coordination according to the second PRS configuration, to determine the first PRS configuration and/or the candidate first PRS configuration.

In an example, the fifth sending module 210 includes:

a fourth sending sub-module 214 configured to send the third PRS configuration to the first base station that satisfies an interference condition in a radio signal measurement report reported by the user equipment;

or, a fifth sending sub-module 215 configured to send the third PRS configuration to the first base station within a predetermined distance range of the second base station.

In an example, the information transmission apparatus 200 further includes:

a second reception module 240 configured to receive a fourth PRS configuration sent by the second base station, the fourth PRS configuration being determined based on a positioning service requirement of the user equipment; and a third determination module 250 configured to determine the second PRS configuration according to the fourth PRS configuration.

In an example, the fifth sending module 210 includes:

a sixth sending sub-module 216 configured to send an NRPPa message carrying the third PRS configuration to the first base station.

In an example, the NRPPa message includes at least one of the following IE:

a first IE including the third PRS configuration; and a second IE including indication information for requesting positioning information.

In an example, the information transmission apparatus 200 further includes one of:

a fourth determination module 260 configured to determine, according to a received indication of reception success, that reception of the third PRS configuration succeeds;

a fifth determination module 270 configured to determine, according to a received indication of reception failure, that reception of the third PRS configuration fails;

a sixth determination module 280 configured to determine, according to received feedback information, whether the first base station successfully determines the first PRS configuration according to the third PRS configuration; alternatively, determine, according to the received feedback information, whether the first base station does not successfully determine the first PRS configuration according to the third PRS configuration; and a third reception module 290 configured to receive the first PRS configuration returned by the first base station.

In an example, the third PRS configuration includes at least one of the following parameters:

a PRS bandwidth configuration, a PRS configuration index configuration, a PRS muting configuration, a PRS identity configuration, and a PRS sending occasion identity configuration.

In an example, the first determination module 110, the first reception module 120, the first sending module 130, the second sending module 140, the third sending module 150, the fourth sending module 160, the sixth sending module 170, the fifth sending module 210, the second determination module 220, the interference coordination module 230, the second reception module 240, the third determination module 250, the fourth determination module 260, the fifth determination module 270, the sixth determination module 280, the third reception module 290, etc. may be implemented through one or more central processing units (CPU), a graphics processor unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor or the like, for executing the aforementioned methods.

Figure 8:
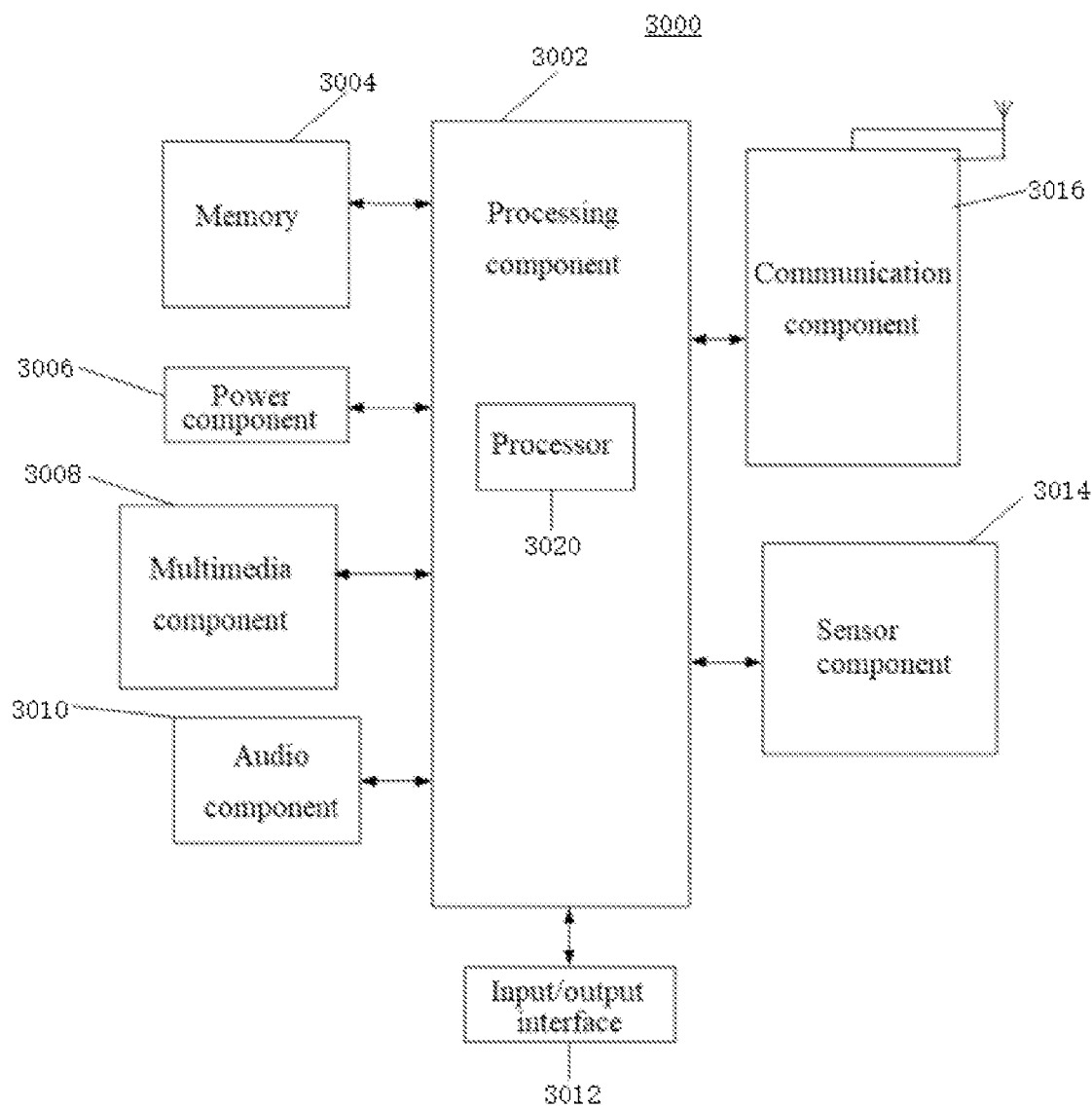
FIG. 8 is a block diagram of an information transmission apparatus according to an example.

FIG. 8 is a block diagram of an information transmission apparatus 3000 according to an example. For example, the apparatus 3000 may be a mobile phone, a computer, a digital broadcast terminal, a message transceiving device, a game console, a tablet device, a medical device, a fitness device, a personal digital assistant or the like.

With reference to FIG. 8, the apparatus 3000 may include one or more of a processing assembly 3002, a memory 3004, a power supply assembly 3006, a multimedia assembly 3008, an audio assembly 3010, an input/output (I/O) interface 3012, a sensor assembly 3014, and a communication assembly 3016.

The processing assembly 3002 generally controls overall operations of the apparatus 3000, for example, operations associated with display, phone calls, data communications, camera operations, and recording operations. The processing assembly 3002 may include one or more processors 3020 to execute an instruction to complete all or some of the steps of the method described above. Further, the processing assembly 3002 may include one or more modules that facilitate interaction between the processing assembly 3002 and other assemblies. For example, the processing assembly 3002 may include a multimedia module, to facilitate interaction between the multimedia assembly 3008 and the processing assembly 3002.

The memory 3004 is configured to store various types of data, to support the operations at the apparatus 3000. For example, these data include instructions for any application or method operating at the apparatus 3000, contact data, phonebook data, messages, pictures, video, etc. The memory 3004 may be implemented by any type of volatile or non-volatile memory apparatus, or their combination, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 3006 provides power for various assemblies of the apparatus 3000. The power supply assembly 3006 may include a power supply management system, one or more power supplies, and other assemblies associated with power generating, managing, and distributing for the apparatus 3000.

The multimedia assembly 3008 includes a screen that provides an output interface between the apparatus 3000 and the user. In some examples, the screen may include a liquid crystal display (LCD) and a touch panel (TP). If the screen includes a touch panel, the screen may be implemented as a touch screen, so as to receive an input signal from a user. The touch panel includes one or more touch sensors, to sense touches, swipes, and gestures on the touch panel. Except for sensing a boundary of a touch or swipe action, the touch sensor may also detect a duration and a pressure associated with touch or swipe operations. In some examples, the multimedia assembly 3008 includes a front-facing camera and/or a rear-facing camera. When the apparatus 3000 is in an operation mode, such as a photographing mode or a video mode, the front-facing camera and/or the rear-facing camera may receive external multimedia data. Each of the front facing camera and the rear facing camera may be a fixed optical lens system or have focusing and optical zooming capabilities.

The audio assembly 3010 is configured to output and/or input audio signals. For instance, the audio assembly 3010 includes a microphone (MIC) configured to receive an. external audio signal when the apparatus 3000 is in the operational mode, for instance, a calling mode, a recording mode, and a speech recognition mode. The received audio signal may be further stored in the memory 3004 or transmitted via the communication assembly 3016. In some examples, the audio assembly 3010 further includes a speaker for outputting the audio signal.

The interface 3012 for I/O provides an interface between the processing assembly 3002 and a peripheral interface module such as a keyboard, a click wheel, buttons, etc. These buttons may include, but are not limited to: a home button, a volume button, a start button, and a lock button.

The sensor assembly 3014 includes one or more sensors for providing state assessments of various aspects of the apparatus 3000. For example, the sensor assembly 3014 may detect an opened/closed state of the apparatus 3000, and relative positioning of the assemblies, such as a display and a keypad of the apparatus 3000. The sensor assembly 3014 may further detect a change in position of the apparatus 3000 or an assembly of the apparatus 3000, a contact or not between the user and the apparatus 3000, an orientation or acceleration/deceleration of the apparatus 3000, and a change in temperature of the apparatus 3000. The sensor assembly 3014 may include a proximity sensor configured to detect the presence of a nearby object in the absence of any physical contact. The sensor assembly 3014 may further include a light sensor, such as a complementary metal oxide semiconductor (CMOS) or a charged coupled device (CCD) image sensor for use in imaging applications. In some examples, the sensor assembly 3014 may also include an acceleration sensor, a gyroscope sensor, a magnetic sensor, a pressure sensor, or a temperature sensor.

The communication assembly 3016 is configured to facilitate wired or radio communication between the apparatus 3000 and other devices. The apparatus 3000 may access a radio network based on a communication standard, such as Wi-Fi, 2G or 3G, or their combination. in an example, the communication assembly 3016 receives a broadcast signal or broadcast-associated information from an external broadcast management system via a broadcast channel. In an example, the communication assembly 3016 further includes a near field communication (NFC) module, to facilitate short-distance communication. For example, the NFC module may be implemented based on a radio frequency identification (RFID) technology, an infrared data association (IrDA) technology, an ultra wide band (UWB) technology, a Bluetooth (BT) technology; etc.

In an example, the apparatus 3000 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for executing the method above.

In an example, further provided is a non-transitory computer-readable storage medium including an instruction, for example, a memory 3004 including an instruction, and the instruction may be executed by the processor 3020 of the apparatus 3000 so as to execute the method described above. For example, the non-transitory computer-readable storage medium may be an ROM, a random access memory (RAM), a compact disk (CD)-ROM, a magnetic tape, a floppy disk, an optical data storage device, etc.

According to a first aspect of the disclosure, an information transmission method is provided. The information transmission method is applied to a first base station and includes:

determining a first positioning reference signal (PRS) configuration for sending a first PRS, where the first PRS configuration is determined based on a second PRS configuration used when a second base station sends a second PRS; and an interference degree between the first PRS sent by the first base station according to the first PRS configuration and the second PRS sent by the second base station according to the second PRS configuration satisfies of a low interference condition.

In an example, the method further includes:

receiving a third PRS configuration issued by a core network, the third PRS configuration including: the first PRS configuration and/or the second PRS configuration; and the determining a first FIRS configuration for sending a first PRS includes:

obtaining the first PRS configuration issued by the core network and generated based on the second PRS configuration;

or, determining the first PRS configuration according to the second PRS configuration issued by the core network;

or, obtaining at least one candidate first PRS configuration issued by the core network and generated based on the second PRS configuration, and the second PRS configuration; and determining the first PRS configuration according to the second PRS configuration issued by the core network, the first PRS configuration being one of the at least one candidate first PRS configuration.

In an example, determining the first PRS configuration according to the second PRS configuration issued by the core network includes:

carrying out PRS interference coordination according to the second PRS configuration, to determine the first PRS configuration.

In an example, the second PRS configuration is determined based on a positioning service requirement of user equipment.

In an example, the receiving a third PRS configuration issued by a core network includes:

receiving a new radio interface positioning protocol A (NRPPa) message carrying the third PRS configuration.

In an example, the NRPPa message includes at least one of the following information element IE):

a first IE including the third PRS configuration; and a second IE including indication information for requesting positioning information.

In an example, the method further includes one of:

sending an indication of reception success in response to reception success of the third PRS configuration;

sending an indication of reception failure in response to reception failure of the third PRS configuration;

sending feedback information in response to the third PRS configuration issued by the core network, the feedback information being used for indicating that the first PRS configuration is successfully determined according to the second PRS configuration issued by the core network;

sending feedback information in response to the third PRS configuration issued by the core network, the feedback information being used for indicating that the first PRS configuration is not successfully determined according to the second PRS configuration issued by the core network; and successfully determining the first PRS configuration in response to the third PRS configuration issued by the core network, and sending the first PRS configuration.

In an example, the third PRS configuration includes at least one of:

a PRS bandwidth configuration, a PRS configuration index configuration, a PRS muting configuration, a PRS identity configuration, and a PRS sending occasion identity configuration.

According to a second aspect of the disclosure, an information transmission method is provided. The information transmission method is applied to a core network and includes:

sending a third PRS configuration to a first base station, where the third PRS configuration includes: a first PRS configuration for the first base station to send a first PRS, and/or a second PRS configuration used when a second base station sends a second PRS, the second PRS configuration being used for the first base station to determine the first PRS configuration, and a degree of interference between the first PRS sent by the first base station using the first PRS configuration and the second PRS sent by the second base station using the second PRS configuration satisfies of a low interference condition.

In an example, sending the third PRS configuration to the first base station includes:

generating the first PRS configuration according to the second PRS configuration, and sending the first PRS configuration to the first base station;

or, sending the second PRS configuration to the first base station, so as to make the first base station determine the first PRS configuration according to the second PRS configuration;

or, sending at least one candidate first PRS configuration generated according to the second PRS configuration and the second PRS configuration, to the first base station, so as to make the first base station determine the first PRS configuration according to the second PRS configuration, the first PRS configuration being one of the at least one candidate first PRS configuration.

In an example, the method further includes:

determining the second PRS configuration based on a positioning service requirement of user equipment.

In an example, the method further includes:

carrying out PRS interference coordination according to the second PRS configuration, to determine the first PRS configuration and/or the candidate first PRS configuration.

In an example, sending the third PRS configuration to the first base station includes:

sending the third PRS configuration to the first base station that satisfies an interference condition in a radio signal measurement report reported by user equipment;

or, sending the third PRS configuration to the first base station within a predetermined distance range of the second base station.

In an example, the method further includes:

receiving a fourth PRS configuration sent by the second base station, the fourth PRS configuration being determined based on a positioning service requirement of the user equipment; and determining the second PRS configuration according to the fourth PRS configuration.

In an example, sending the third PRS configuration to the first base station includes:

sending an NRPPa message carrying the third PRS configuration to the first base station.

In an example, the NRPPa message includes at least one of the following IE:

a first IE including the third PRS configuration; and a second IE including indication information for requesting positioning information.

In an example, the method further includes one of:

determining, according to a received indication of reception success, that reception of the third PRS configuration succeeds;

determining, according to a received indication of reception failure, that reception of the third PRS configuration fails;

determining, according to received feedback information, that the first base station successfully determines the first PRS configuration according to the third PRS configuration;

determining, according to the received feedback information, that the first base station fails to successfully determine the first PRS configuration according to the third PRS configuration; and receiving the first PRS configuration returned by the first base station.

In an example, the third PRS configuration includes at least one of the following parameters:

a PRS bandwidth configuration, a PRS configuration index configuration, a PRS muting configuration,

What is claimed is:

1. A method for information transmission applied to a first base station, the method comprising:
   determining a first positioning reference signal (PRS) configuration for sending a first PRS, wherein the first PRS configuration is determined based on a second PRS configuration used when a second base station sends a second PRS; and a degree of interference between the first PRS sent by the first base station according to the first PRS configuration and the second PRS sent by the second base station according to the second PRS configuration satisfies of a low interference condition; and
   receiving a third PRS configuration issued by a core network; wherein the receiving the third PRS configuration issued by the core network comprises:
      receiving a new radio interface positioning protocol A (NRPPa) message carrying the third PRS configuration, wherein the NRPPa message comprises at least one of information element (IE):
      a first IE comprising the third PRS configuration; or
      a second IE comprising indication information for requesting positioning information.

2. The method according to claim 1, wherein:
   the third PRS configuration comprises at least one of the first PRS configuration or the second PRS configuration; and
   the determining the first PRS configuration for sending the first PRS comprises at least one of:
      obtaining the first PRS configuration issued by the core network and generated based on the second PRS configuration,
      determining the first PRS configuration according to the second PRS configuration issued by the core network, or
      obtaining at least one candidate first PRS configuration issued by the core network and generated based on the second PRS configuration, and the second PRS configuration; and determining the first PRS configuration according to the second PRS configuration issued by the core network, the first PRS configuration being one of the at least one candidate first PRS configuration.

3. The method according to claim 2, wherein the determining the first PRS configuration according to the second PRS configuration issued by the core network comprises:
   carrying out PRS interference coordination according to the second PRS configuration, to determine the first PRS configuration.

4. The method according to claim 2, wherein
   the second PRS configuration is determined based on a positioning service requirement of user equipment.

5. The method according to claim 2, further comprising at least one of:
   sending an indication of reception success in response to reception success of the third PRS configuration,
   sending an indication of reception failure in response to reception failure of the third PRS configuration,
   sending feedback information in response to the third PRS configuration issued by the core network, the feedback information being used for indicating that the first PRS configuration is successfully determined according to the second PRS configuration issued by the core network,
   sending feedback information in response to the third PRS configuration issued by the core network, the feedback information being used for indicating that the first PRS configuration is not successfully determined according to the second PRS configuration issued by the core network, or
   successfully determining the first PRS configuration in response to the third PRS configuration issued by the core network, and sending the first PRS configuration.

6. The method according to claim 2, wherein the third PRS configuration comprises at least one of:
   a PRS bandwidth configuration,
   a PRS configuration index configuration,
   a PRS muting configuration,
   a PRS identity configuration, or
   a PRS sending occasion identity configuration.

7. A non-transitory computer-readable storage medium, storing an executable program, wherein the executable program when executed by a processor of the first base station, causes the first base station to perform the method according to claim 1.

8. The method according to claim 1, wherein the satisfies of the low interference condition comprises at least one of:
   no interference between the first PRS and the second PRS; or
   a degree of no interference between the first PRS and the second PRS is lower than an interference threshold;
   wherein the no interference between the first PRS and the second PRS comprises at least one of:
      the first PRS is orthogonal to the second PRS in a time domain; or
      a signal coverage area of the first PRS does not overlap a signal coverage area of the second PRS.

9. A method for information transmission applied to a core network, the method comprising:
   sending a third PRS configuration to a first base station, wherein the third PRS configuration comprises at least one of:
      a first PRS configuration for the first base station to send a first PRS,
      a second PRS configuration used when a second base station sends a second PRS, wherein the second PRS configuration is configured for the first base station to determine the first PRS configuration, or
      a degree of interference between the first PRS sent by the first base station using the first PRS configuration and the second PRS sent by the second base station using the second PRS configuration satisfies of a low interference condition;
   wherein the sending the third PRS configuration to the first base station comprises:
      sending an NRPPa message carrying the third PRS configuration to the first base station, wherein the NRPPa message comprises at least one of information element (IE): a first IE comprising the third PRS configuration; or a second IE comprising indication information for requesting positioning information.

10. The method according to claim 9, wherein the sending the third PRS configuration to the first base station comprises at least one of:
    generating the first PRS configuration according to the second PRS configuration, and sending the first PRS configuration to the first base station,
    sending the second PRS configuration to the first base station, so as to make the first base station determine the first PRS configuration according to the second PRS configuration, or
    sending at least one candidate first PRS configuration generated according to the second PRS configuration and the second PRS configuration, to the first base station, so as to make the first base station determine the first PRS configuration according to the second PRS configuration, the first PRS configuration being one of the at least one candidate first PRS configuration.

11. The method according to claim 9, further comprising: determining the second PRS configuration based on a positioning service requirement of user equipment.

12. The method according to claim 10, further comprising:
carrying out PRS interference coordination according to the second PRS configuration, to determine the first PRS configuration and/or the candidate first PRS configuration.

13. The method according to claim 9, wherein the sending the third PRS configuration to the first base station comprises at least one of:
sending the third PRS configuration to the first base station that satisfies an interference condition in a radio signal measurement report reported by user equipment, or
sending the third PRS configuration to the first base station within a predetermined distance range of the second base station.

14. The method according to claim 9, further comprising:
receiving a fourth PRS configuration sent by the second base station, the fourth PRS configuration being determined based on a positioning service requirement of a user equipment; and
determining the second PRS configuration according to the fourth PRS configuration.

15. The method according to claim 9, further comprising at least one of:
determining, according to a received indication of reception success, that reception of the third PRS configuration succeeds,
determining, according to a received indication of reception failure, that reception of the third PRS configuration fails,
determining, according to received feedback information, that the first base station successfully determines the first PRS configuration according to the third PRS configuration,
determining, according to the received feedback information, that the first base station fails to successfully determine the first PRS configuration according to the third PRS configuration, or
receiving the first PRS configuration returned by the first base station.

16. The method according to claim 9, wherein the third PRS configuration comprises at least one of:
a PRS bandwidth configuration,
a PRS configuration index configuration,
a PRS muting configuration,
a PRS identity configuration, or
a PRS sending occasion identity configuration.

17. A communication device, comprising:
a transceiver,
a memory that stores an executable program,
one or more processors that are communicatively coupled to the memory and the transceiver, wherein the executable program when collectively executed by the one or more the processors, cause the communication device to act as the core network and perform the method according to claim 9.

18. A non-transitory computer-readable storage medium, storing an executable program, wherein the executable program when executed by a processor of the core network, causes the core network to perform the method according to claim 9.

19. A communication device comprising:
a processor, a transceiver,
a memory, and
an executable program stored on the memory and executable by the processor, wherein when running the executable program, the processor is configured to:
determine a first positioning reference signal (PRS) configuration for sending a first PRS, wherein the first PRS configuration is determined based on a second PRS configuration used when a second base station sends a second PRS; and a degree of interference between the first PRS sent by a first base station according to the first PRS configuration and the second PRS sent by the second base station according to the second PRS configuration satisfies of a low interference condition; and
receive a third PRS configuration issued by a core network wherein the receive the third PRS configuration issued by the core network comprises:
receiving a new radio interface positioning protocol A (NRPPa) message carrying the third PRS configuration, wherein the NRPPa message comprises at least one of information element (IE):
a first IE comprising the third PRS configuration; or
a second IE comprising indication information for requesting positioning information.

\* \* \* \* \*

UNITED STATES PATENT AND TRADEMARK OFFICE
CERTIFICATE OF CORRECTION

| | | |
|---|---|---|
| PATENT NO. | : 12,418,378 B2 | Page 1 of 1 |
| APPLICATION NO. | : 17/923450 | |
| DATED | : September 16, 2025 | |
| INVENTOR(S) | : Xiandong Dong | |

It is certified that error appears in the above-identified patent and that said Letters Patent is hereby corrected as shown below:

In the Specification
In Column 4, Line 6, delete "public" and insert -- packet --, therefor.
In Column 7, Line 40, delete "FRS" and insert -- PRS --, therefor.
In Column 14, Line 26, delete "anchor" and insert -- and/or --, therefor.
In Column 16, Line 12, delete "may be a" and insert -- may be a full --, therefor.
In Column 17, Line 15, delete "hits" and insert -- bits --, therefor.
In Column 18, Line 31, delete "occasion" and insert -- An occasion --, therefor.
In Column 18, Line 41, delete "method" and insert -- A method --, therefor.
In Column 19, Line 31, delete "an" and insert -- an IE --, therefor.
In Column 24, Line 55, delete "FIRS" and insert -- PRS --, therefor.

In the Claims
In Column 30, Line 15, in Claim 17, delete "the processors," and insert -- processors, --, therefor.

Signed and Sealed this
Sixteenth Day of December, 2025

John A. Squires
*Director of the United States Patent and Trademark Office*